United States Patent [19]

Weissel

[11] 4,186,145

[45] Jan. 29, 1980

[54] PROCESS FOR THE HYDROGENATION OF AN AROMATIC AMINE AND THE SUPPORTED RUTHENIUM CATALYST USED IN THE PROCESS

[75] Inventor: Oskar Weissel, Krefeld, Fed. Rep. of Germany

[73] Assignee: Bayer Aktiengesellschaft, Leverkusen, Fed. Rep. of Germany

[21] Appl. No.: 948,354

[22] Filed: Oct. 3, 1978

[30] Foreign Application Priority Data

Oct. 7, 1977 [DE] Fed. Rep. of Germany ....... 2745172

[51] Int. Cl.$^2$ .......................... C07C 85/24; B01J 23/64
[52] U.S. Cl. ................................. 260/563 D; 252/470
[58] Field of Search .................... 252/470; 260/563 D

[56] References Cited

U.S. PATENT DOCUMENTS

| | | | |
|---|---|---|---|
| 3,636,108 | 1/1972 | Brake | 260/563 D |
| 3,894,965 | 7/1975 | Foster et al. | 252/470 X |

*Primary Examiner*—W. J. Shine
*Attorney, Agent, or Firm*—Sprung, Felfe, Horn, Lynch & Kramer

[57] ABSTRACT

A supported ruthenium catalyst comprising a hydroxide, hydrated oxide or oxide of chromium and manganese as the catalyst support, said catalyst containing an inorganic and/or organic alkali metal compound, a process for its preparation and use of such supported ruthenium catalyst as a catalyst especially for nuclear hydrogenation of aromatic amines.

19 Claims, No Drawings

PROCESS FOR THE HYDROGENATION OF AN AROMATIC AMINE AND THE SUPPORTED RUTHENIUM CATALYST USED IN THE PROCESS

The invention relates to a supported ruthenium catalyst, a process for its preparation and its use as a hydrogenation catalyst.

A supported ruthenium catalyst, the catalyst support of which consists of hydroxides and/or hydrated oxides of chromium and manganese and/or dehydration i.e. oxide products thereof, and a process for the preparation of the supported ruthenium catalyst is known from German Offenlegungsschrift No. 2,502,894 and U.S. Pat. No. 4,049,584 the disclosures of which are hereby incorporated herein by reference.

This catalyst is appropriately prepared in two stages, the catalyst support being initially prepared in the first stage, for example by common precipitation of a mixture of chromium hydroxide and manganese hydroxide from a solution containing chromium salts and manganese salts and subsequent washing out of the soluble constituents with water, or by reaction of freshly precipitated manganese carbonate with ammonium bichromate in an aqueous medium at 70° to 100° C., and the ruthenium being applied to this support in the second stage, if appropriate after heat treatment of the support.

The use of the catalyst for the catalytic hydrogenation of aromatic amines is also described therein.

A supported ruthenium catalyst, the catalyst support of which consists of hydroxides and/or hydrated oxides of chromium and manganese and/or dehydration products i.e. oxide thereof, has now been found, which is characterised in that it contains inorganic and/or organic alkali metal compounds.

Examples which may be mentioned of inorganic and/or organic alkali metal compounds are the oxides, hydroxides, alcoholates and alkali metal salts of inorganic and organic acids, and reaction products thereof with the chromium compounds and manganese compounds contained in the catalyst support, such as carbonates, bicarbonates, chromates, chromites, manganates, manganites and salts of lower carboxylic acids. Examples which may be mentioned of inorganic and organic alkali metal compounds are: lithium hydroxide, sodium oxide, sodium hydroxide, sodium carbonate, sodium bicarbonate, sodium methylate, sodium ethylate, sodium acetate, potassium oxide, potassium hydroxide, potassium carbonate, potassium methylate, rubidium hydroxide and reaction products thereof with the chromium compounds and manganese compounds contained in the catalyst support, i.e. sodium manganite, sodium manganate, sodium chromite, potassium manganite, potassium manganate, potassium chromite.

In general, the content of alkali metal compounds, calculated as oxides, in the catalyst according to the invention is 0.05 to 15% by weight, preferably 0.1 to 10% by weight and particularly preferably 0.2 to 8.0% by weight.

The ruthenium content of the catalyst, calculated as ruthenium, is in general 0.1 to 10% by weight, preferably 0.5 to 5% by weight, relative to the supported catalyst.

The weight ratio of the elements manganese and chromium to one another in the catalyst support is in general 0.2:1 to 5:1, preferably 0.5:1 to 3:1 and in particular 0.8:1 to 2:1.

The catalyst according to the invention can be prepared by methods which are in themselves known.

It can be prepared, for example, by a process in which, after applying the ruthenium to the catalyst support, a supported ruthenium catalyst prepared according to DT-OS (German Published Specification) No. 2,502,894 is treated with a solution consisting of inorganic and/or organic alkali metal compounds and then dried.

In a preferred embodiment, the catalyst is prepared by a process in which ruthenium hydroxide is first precipitated, from an aqueous, acidic ruthenium chloride solution by precipitation with alkali metal hydroxide solutions or alkali metal carbonate solutions, onto a catalyst support containing chromium and manganese, which is obtained by reaction of freshly precipitated manganese-II compounds with chromium-VI compounds in an aqueous medium at about 50 to about 100° C., subsequent drying at about 120° C. and after-treatment at about 200° to 450° C., and the catalyst is subsequently treated with a solution of inorganic and/or organic alkali metal compounds and then dried and appropriately treated with hydrogen.

In a further preferred form of preparation, the catalyst support containing chromium and manganese, used for the preparation of the catalyst according to the invention, can also be obtained from ammonium manganese chromates, obtainable by reacting manganese-II salts with ammonium bichromate in aqueous solution (see, for example, Gmelins Handbuch der anorganischen Chemie (Gmelins Handbook of Inorganic Chemistry), 8th edition, Manganese Part C, pp. 198 to 199), by heating to about 200° to 450° C., preferably 250 to 350° C. The catalyst is then prepared according to the invention by precipitating a sparingly soluble ruthenium compound, for example from an aqeuous, acidic ruthenium chloride solution, and then treating the catalyst with a solution of inorganic and/or organic alkali metal compounds.

Examples of inorganic and/or organic alkali metal compounds which are suitable for treating the supported ruthenium catalyst are the oxides, hydroxides, alcoholates and alkali metal salts of those acids which, either themselves or in the form of their reduction products, are not considered hydrogenation catalyst poisons in the sense of the customary definition, for example, according to Zymalkowski, Katalytische Hydrierung (Catalytic Hydrogenation), pp. 36, (1965); and Houben-Weyl, Methoden der organischen Chemie (Methods of Organic Chemistry), (1955), Vol. 4/2, pp. 257), the disclosures of which are hereby incorporated herein by reference. That is to say, in particular, those which are free from N, P, As, Sb, S, Se, Te, Cl, Br and I, such as the carbonates, bicarbonates, and acetates and the alkali metal salts of other lower carboxylic acids with up to 7 carbon atoms are contemplated. Examples which may be mentioned of alkali metal compounds are: lithium hydroxide, sodium hydroxide, sodium carbonate, sodium bicarbonate, sodium methylate, sodium ethylate, sodium acetate, potassium oxide, potassium hydroxide, potassium carbonate, potassium methylate and rubidium hydroxide.

In general, the concentration of the alkali metal compounds in the solution used is about 0.02 to 5 N, preferably 0.02 to 2 N and in particular 0.1 to 1 N.

Drying of the catalyst can be carried out at temperatures in the range of about 20° to about 150° C., preferably to 120° C.

However, the catalyst according to the invention can also be prepared by a process in which a catalyst support containing manganese, chromium and an inorganic and/or organic alkali metal compound is prepared in a first stage, onto which ruthenium is then precipitated in a sparingly soluble form in the customary manner in a second stage.

In this procedure, in a preferred embodiment, the catalyst support can be obtained from mixed manganese-II chromates, which contain alkali metal ions and optionally ammonium ions as further cations, by heating to temperatures of about 200° to 450° C., preferably 250° to 350° C.

Such mixed manganese chromates which also contain proportions of alkali metal chromates and optionally ammonium chromates can be prepared by a precipitation reaction in an aqueous medium at pH ≧ 6, by bringing together soluble manganese salts and alkali metal compounds and optionally ammonium compounds, some of which preferably being employed as the chromate or bichromate.

However, it is also possible to use, for example, chromium trioxide as the chromium-VI compound, if the pH value necessary for the precipitation is established by choosing the appropriate basic alkali metal compounds and ammonium compounds.

Some definite alkali metal manganese double chromates, for example $KMn_2(CrO_4)_2OH \cdot H_2O$, which likewise are suitable starting materials for the catalysts according to the invention, can be prepared in this manner (according to Gmelins Handbuch der anorganischen Chemie (Gmelins Handbook of Inorganic Chemistry), 8th edition, Manganese Part C, pp. 197 to 198).

However, it is not necessary to prepare such definite double chromates. On the contrary, the alkali metal content of the precipitation products can vary within wide limits by suitable adjustment of the alkali metal content relative to that of the ammonium compound.

The optimum alkali metal content for the particular intended use can easily be determined by a few preliminary experiments.

The catalyst according to the invention can be used directly after drying. However, it can also be advantageous to subject it to treatment with hydrogen at temperatures of about 20° to about 200° C. before use.

The catalysts according to the invention are particularly suitable for the preparation of cycloaliphatic amines by nuclear hydrogenation of corresponding aromatic amines.

Possible starting compounds for this process are aniline and substituted anilines.

This process can thus be used for catalytic nuclear hydrogenation of aromatic amines of the formula

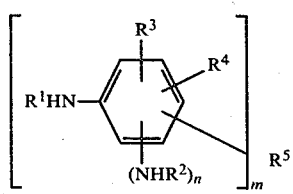

(I)

in which
$R^1$, $R^2$, $R^3$ and $R^4$ are identical or different and represent hydrogen or an alkyl radical,
n represents the numbers 0 or 1,
m represents the numbers 1, 2 or 3 and $R^5$, can represent hydrogen or an optionally substituted monovalent, divalent or trivalent aliphatic, cycloaliphatic, araliphatic or aromatic radical.

Alkyl radicals $R^1$, $R^2$, $R^3$ and $R^4$ which may be mentioned are straight-chain and branched alkyl radicals with 1 to 10 C atoms, preferably with up to 6 and in particular up to 4, C atoms, for example methyl, ethyl, propyl, isopropyl, butyl, isobutyl, tert.-butyl and the isomeric pentyl and hexyl radicals.

An aliphatic radical $R^5$ which may be mentioned is a straight-chain and branched hydrocarbon radical with 1 to 10 C atoms, preferably with up to 6 C atoms and in particular with up to 3 C atoms, for example a methyl, methylene, methine, ethyl, 1,1-ethylene, 1,2-ethylene, 1-propyl, 2-propyl, 2,2-propylene, 1-butyl, 2-butyl, tert.-butyl, 2-methyl-1,4-butylene or 1,1,3-trimethyl-1,3-propylene radical, preferably a methylene radical and a 2,2-propylene radical.

A cycloaliphatic radical $R^5$ which may be mentioned is a cycloaliphatic radical with up to 10 C atoms, preferably a 5-membered radical and a 6-membered radical, for example a cyclopentyl, cyclopentylidene, cyclohexyl or cyclohexylidene radical.

An araliphatic radical $R^5$ which may be mentioned is an araliphatic radical with up to 35 C atoms, preferably an araliphatic radical with up to 18 C atoms in the aromatic part and 9 C atoms in the aliphatic part, in particular an araliphatic radical which contains one or two benzene nuclei, preferably a benzyl, benzylidene, phenylethyl, phenylisopropyl, xylylene, phenylene-bis-isopropyl or methylene-bis-benzyl radical.

An aromatic radical $R^5$ which may be mentioned is an aromatic radical with up to 14 C atoms, preferably a phenyl, phenylene and naphthyl radical, in particular a phenyl radical.

Examples which may be mentioned of substituents of the optionally substituted radical $R^5$ are: alkyl radicals, the amino group and the alkylamino group, in which the alkyl radicals have the meaning indicated above.

A particular group of compounds of the general formula I thus corresponds to the formula

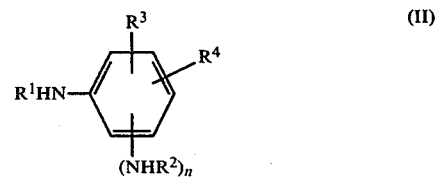

(II)

in which
$R^1$, $R^2$, $R^3$, $R^4$ and n have the meaning indicated above.

Examples which may be mentioned of compounds of the general formula II are: aniline, alkylanilines, such as o-, m- and p-toluidine, xylidines, such as 1,2,3-, 1,2,4-, 1,3,4- and 1,3,5-xylidine, ethyl-, propyl-, isopropyl-, butyl-, isobutyl- and tert.-butyl-substituted anilines and anilines substituted by higher alkyl radicals with up to 10 C atoms; and furthermore N-alkylanilines, such as N-methylaniline, N-ethylaniline, N-propylaniline, N-isopropylaniline and the isomeric N-butyl-, N-pentyl- and N-hexyl-anilines; and o-, m- and p-phenylenediamine, 2,4-diaminotoluene and 2,6-diaminotoluene.

A further group of compounds of the general formula I corresponds to the formula

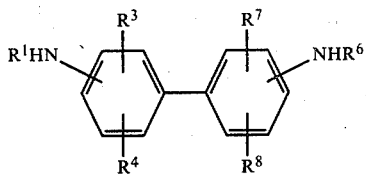

(III)

in which
R[1], R[3], R[4], R[6], R[7] and R[8] are identical or different and represent hydrogen or an alkyl radical with the meaning described above.

Examples which may be mentioned of compounds of the general formula III are: benzidine and tolidine.

A further preferred group of compounds of the general formula I corresponds to the formula

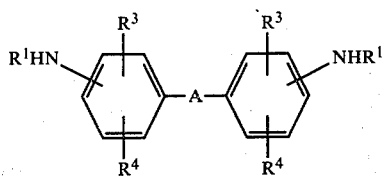

(IV)

in which
R[1], R[2], R[3] and R[4] have the abovementioned meaning and
A represents a divalent aliphatic or cycloaliphatic radical with up to 10 C atoms.

Preferred compounds of the general formula IV which may be mentioned are: 4,4'-diamino-diphenylmethane, 2,4'-diamino-diphenylmethane, bis-(4-methylamino-phenyl)-methane, 3,3',5,5'-tetramethyl-4,4'-diamino-diphenylmethane, 3,3',5,5'-tetraethyl-4,4'-diamino-diphenylmethane, 2,2-bis-(4-aminophenyl)-propane, 1,1-bis-(4-aminophenyl)-cyclohexane and 1,3-bis-(4-aminophenyl)-1,1,3-trimethyl-propane.

A further preferred group of starting compounds of the general formula I corresponds to the formula

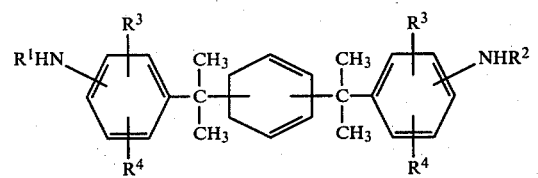

(V)

in which
R[1], R[2], R[3] and R[4] have the meaning indicated above.

Preferred compounds of the formula V which may be mentioned are: α,α'-bis-(4-aminophenyl)-m-diisopropylbenzene, α,α-bis-(4-aminophenyl)-p-diisopropylbenzene, α,α'-bis-(4-methylaminophenyl)-p-diisopropylbenzene, α,α'-bis-(4-methylaminophenyl)-m-diisopropylbenzene, and mixtures of the abovementioned isomeric compounds.

A particular group of substituted anilines of the formula I corresponds to the general formula VI

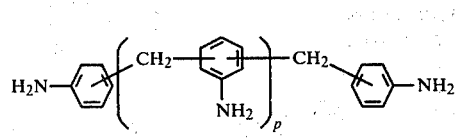

(VI)

in which p represents the numbers 0 or 1.

Examples of compounds of the general formula VI are diaminodiphenylmethane and di-(aminobenzyl)-aniline.

These compounds are prepared on a large scale in the chemical industry by condensation of aniline with formaldehyde. They are always obtained as mixtures with one another, and in some cases in association with polyamines which are tetranuclear and more than tetranuclear.

Their separation from the crude reaction mixtures in a purity which is adequate for the hydrogenation processes known hitherto is indeed possible in principle. However, it is expensive and wasteful.

Surprisingly, it has now been found that the preparation of cycloaliphatic amines according to the process according to the invention is possible not only when the pure, definite compounds of the formula VI are employed, but it also possible, in outstanding yields, when the compounds are employed as mixtures with one another, in the form of crude condensation products of aniline with formaldehyde, without prior separation into individual constituents and without further purification.

The composition of the condensation products can vary within wide limits. In general, however, those starting products with a dinuclear content (p=0) of more than 50% by weight and a content of compounds which are tetranuclear and more than tetranuclear (p=2 to 5) of less than 30% by weight are used.

Those starting products with a dinuclear content (p=0) of over 60% by weight and a content of compounds which are tetranuclear and more than tetranuclear (p=2 to 5) under 15% by weight are preferably used. The starting products can contain, as impurities, small amounts of substances such as can customarily arise during the condensation of aniline with formaldehyde, for example aniline itself, aminobenzylaniline, water and sodium chloride.

In general, the process according to the invention is carried out at temperatures in the range from about 150° C. to about 350° C., preferably in the temperature range from about 180° C. to 300° C.

The process according to the invention is usually carried out under an increased pressure of hydrogen, a pressure above 100 bars being advantageous. The process is preferably carried out in the pressure range from about 150 to 1,000 bars.

In general, the process according to the invention is carried out in the absence of solvents.

The process according to the invention enables very small amounts of catalyst to be employed. In general, the catalyst is used in an amount in which the ruthenium content is about 0.001 to 0.5 g, preferably about 0.005 to 0.2 g and in particular 0.01 to 0.1 g, per kg of the starting product to be hydrogenated.

It was surprising that this amount of catalyst, which is small even for the nuclear hydrogenation of pure, single compounds, is sufficient for the hydrogenation of impure crude products, since it is known that the hydrogenation of non-purified products is made difficult, and is either not possible at all or is possible only using large amounts of catalyst (Houben-Weyl, Methoden der organischen Chemie (Methods of Organic Chemistry), Vol. 4/2, pp. 256–258).

The process according to the invention can be carried out in the customary manner, either discontinuously or continuously, for example as a sump phase process using a pulverulent catalyst in a stirred autoclave, or in accordance with the trickle phase principle using a catalyst in the form of lumps in a reaction tube.

The reaction can be conducted in a manner such that in the case of polynuclear aromatic compounds, all or only some of the aromatic nuclei are hydrogenated.

Hydrogenation of the 2-nuclear compounds proceeds more readily relative to that of compounds which are more than 2 nuclear, so that in some cases it is possible to stop the hydrogenation at the desired stage.

In general, the hydrogenated products are colorless substances which, depending on the nature, number and concentration of the components, are crystalline, pasty or liquid.

The perhydrogenated products of product mixtures of the general formula VI are in general water-clear, viscous liquids which, in the case of contents of dinuclear compounds of below 70% by weight, no longer crystallize at room temperature.

In some cases they can be used in the form thus obtained, without further purification, for example as curing agents for epoxide resins or as valuable intermediate products for the preparation of polycondensation plastics.

However, one can also separate the hydrogenation products into definite fractions which are dinuclear, trinuclear and more than trinuclear without difficulty, for example by fractional distillation, by which means, for example, a particularly economic source for diaminodicyclohexylmethane is made available.

4,4'-Diaminodicyclohexylmethane has, for example, already found numerous applications in the chemistry of plastics and fibres (German Offenlegungsschriften Nos. 1,593,238, 1,768,535, 1,810,924, 1,918,098 and 1,933,866; and Chem. Ind. XXII (May 1970), pp. 343).

The catalyst according to the invention is distinguished by a high selectivity and a high catalytic stability.

The high selectivity of the catalyst according to the invention, which is reflected in high yields and a very low proportion of side reactions, is particularly clearly manifested in cases where the catalyst is employed in the form of lumps, for example in accordance with the trickle process, which is particularly economic in operation.

A further advantage of the catalyst according to the invention is that the high selectivity is largely retained even at high temperatures, for example at those of about 300° C. This makes high throughputs over the catalyst possible on the one hand, and on the other hand also permits operating procedures with high temperature tolerances.

The increased catalytic stability of the catalyst according to the invention results, in particular, in the mode of action of the catalyst being constant over a long period, which makes particularly economic operation possible.

The examples which follow are intended to illustrate the process according to the invention, but without limiting it to these examples.

EXAMPLE 1

A solution of 2,500 g of sodium carbonate in 10 l of water is added to a solution of 3,000 g of $MnSO_4.H_2O$ in 15 l of water in the course of about 10 minutes, whilst stirring. The precipitate which has separated out is washed until free from sulphate and suspended in 10 l of water and the suspension is heated to 85° C., whilst stirring. A solution of 5,350 g of ammonium bichromate in 7,000 ml of water is allowed to run into this suspension at 85° C. and the mixture is subsequently stirred at 85° C. for a further 3 hours. After cooling, the dark precipitate is filtered off, rinsed with a litter water and dried at 120° C. 3,510 g of a brown-black powder are obtained.

500 g of the powder are heated to 250° to 260° C. for about 30 minutes. 405 g of a brown-black powder are obtained (support (1)).

100 g of the homogenized support (1) are suspended in 500 ml of water, and a solution of 2.48 of ruthenium chloride hydrate (Ru content: 40.3%) in 200 ml of 0.05 N HCl is added at room temperature, whilst stirring. About 140 ml of N sodium hydroxide solution are then added dropwise in the course of about 5 minutes until the pH value is 9 to 10. After subsequently stirring the mixture for five hours, the catalyst is separated off, washed with 0.1 normal sodium hydroxide solution until free from chloride, separated off and dried at 110° C. (catalyst (1a)).

The catalysts (1b) to (1d) are obtained in a corresponding manner, by washing the ruthenium, after separating it off, with 0.2 to 1.0 normal sodium hydroxide solution instead of with 0.1 normal sodium hydroxide solution, and then separating off the catalysts and drying them at 110° C., as described above:

Table 1

| Catalyst | | (1a) | (1b) | | (1c) | (1d) |
|---|---|---|---|---|---|---|
| Concentration of the NaOH used | | 0.1 N | 0.2 N | | 0.3 N | N |
| Analysis: Ru | (%) | 1.0 | 1.0 | | 1.0 | 1.0 |
| Na₂O | (%) | 0.6 | 1.4 | | 2.4 | 5.1 |
| Mn | (%) | ← | ← | 32.0 | → | → |
| Cr | (%) | ← | ← | 29.0 | → | → |

EXAMPLE 2

2,040 g of $Na_2CO_3$ in 8 l of water are first added to a solution of 2,416 g of $MnSO_4.H_2O$ in 15 l of water in the manner described in Example 1.

The precipitate which has separated out is then filtered off, washed until free from sulphate and suspended in 8 l of hot water at 95° C., and, after adding a hot solution of 4,320 g of $(NH_4)_2Cr_2O_7$ in 5.6 l of water, the mixture is stirred to 90° to 95° C. for 4 hours. It is allowed to cool and the dark precipitate is separated off and dried at 120° C. 2,820 g of a brown-black powder are obtained.

This powder, in approximately 560 g portions, is heated to 300° C. in the course of about 30 to 40 minutes in an apparatus which makes slow, uniform agitation of the powder possible.

2,145 g of a brown-black powder are obtained, which is ground in a ball mill with 64 g of graphite, and the mixture is then pressed to 3 mm tablets (support (2)).

100 g of the support (2) are sprayed first with a solution of 1.24 g of $RuCl_3.XH_2O$ (40.4% of Ru) in 40 ml of 0.1 normal HCl and then with 40 ml of 4 normal sodium hydroxide solution in a coating drum, heated to 110°–120° C., in the course of 30 minutes in each case, at the rate at which the solvent evaporates. After cooling, the catalyst is then washed with 0.2 normal sodium hydroxide solution until free from chloride and dried (catalyst (2a)).

The catalysts (2b) to (2f) are obtained in a corresponding manner when the catalyst is washed with normal NaOH, 2 normal NaOH, normal KOH, 0.5 normal KOH and normal LiOH, instead of with 0.2 normal sodium hydroxide solution.

For comparison, a further batch of catalyst is washed with water instead of with 0.2 normal sodium hydroxide solution (catalyst (2 g)).

Table 2

| Catalyst | (2a) | (2b) | (2c) | (2d) | (2e) | (2f) | (2g) |
|---|---|---|---|---|---|---|---|
| Washing liquid | 0.2N sodium hydroxide solution | N | 2N | N potassium hydroxide solution | 0.5N | N LiOH | $H_2O$ |
| Analysis Ru (%) | 0.5 | 0.5 | 0.5 | 0.5 | 0.5 | 0.5 | 0.5 |
| Alkali metal (%) oxide | 0.4 | 1.9 | 3.7 | 2.6 | 1.3 | 1.1 | |
| Mn (%) | ← | ← | 30.3 | → | → | → | → |
| Cr (%) | ← | ← | 27.0 | → | → | → | → |

Example 2 g is not according to the invention, but was carried out for comparison purposes.

EXAMPLE 3

84.6 g of $MnSO_4H_2O$ and 63.0 g of $(NH_4)Cr_2O_7$ are dissolved in 730 ml of water, and 125 ml of 6 normal $NH_3$ are added in the course of 10 minutes, whilst stirring. The mixture is subsequently stirred for 30 minutes and the precipitate is separated off, washed until free from sulphate and dried at 110° C. 97 g of a black-brown powder are obtained.

86 g of the powder are heated to 300° C. in the course of 60 minutes. 68.0 g of a black-brown powder are obtained (support 3).

Analysis: Mn: 32.6% Cr: 29.1%

10.0 g of the support (3) are suspended in 50 ml of water, and first a solution of 248 mg of $RuCl_3.XH_2O$ (40.3% of Ru) in 20 ml of 0.02 N HCl and then 12.8 ml of N sodium hydroxide solution are added, whilst stirring. The mixture is subsequently stirred for 60 minutes and the catalyst is separated off, washed with 0.1 N sodium hydroxide solution until free from chloride and dried at 120° C. 10.1 g of product are obtained (catalyst (3)).

Analysis: Ru: 0.95% $Na_2O$: 0.3%.

EXAMPLE 4

A solution of 97.1 g of $K_2CrO_4$ in 330 ml of water is first added to a solution of 84.6 g of $MnSO_4.H_2O$ in 400 ml of water at room temperature in the course of 10 minutes, whilst stirring, and 125 ml of 2 N potassium hydroxide solution are added in the course of a further 10 minutes. The mixture is subsequently stirred for 30 minutes and the black-brown precipitate is separated off and washed with water until free from sulphate. After drying, 104 g of a brown-black powder are obtained.

89 g of the product are heated to 300° C. in the course of 60 minutes. 81 g of a brown-black powder are obtained (support (4)).

Analysis: Mn: 25.6% Cr: 24.7% $K_2O$: 12.2%

10.0 g of the support (4) are suspended in 50 ml of water, and first a solution of 248 mg of $RuCl_3.XH_2O$ (40.3% of Ru) in 20 ml of 0.02 normal hydrochloric acid and then, in the course of 10 minutes, 30 ml of N sodium hydroxide solution are added, whilst stirring. The mixture is subsequently stirred for 60 minutes and the catalyst is washed until free from chloride and dried (catalyst (4)).

EXAMPLE 5

A solution of 81.0 g of $Na_2CrO_4$ in 330 ml of water, and 125 ml of 2 N sodium hydroxide solution are added successively to a solution of 84.6 g of $MnSO_4.H_2O$ in 400 ml of water, whilst stirring. The mixture is subsequently stirred for 30 minutes and the precipitate is separated off and washed until free from sulphate. After drying, 80.6 g of a black filter cake are obtained.

71 g of the product are heated to 330° C. in the course of 60 minutes. 50 g of a black powder are obtained (support (5)).

Analysis: Mn: 22.5% Cr: 37.8% $Na_2O$: 0.9%

10.0 of the support (5) are suspended in 50 ml of water, and 248 mg of $RuCl_3.XH_2O$ (40.3% of Ru) in 20 ml of 0.02 N HCl, and 18 ml of N NaOH are added successively. The mixture is subsequently stirred for 60 minutes and the catalyst is separated off, washed until free from chloride and dried. 10.1 are obtained (catalyst (5)).

EXAMPLE 6

A solution of 50.0 g of $CrO_3$ in 250 ml of water is first added to a solution of 84.6 g of $MnSO_4.H_2O$ in 300 ml of water in the course of 10 minutes, whilst stirring, and a solution of 30.0 g of LiOH in 300 ml of water is added in the course of a further 10 minutes. After 30 minutes, the dark precipitate is separated off, washed until free from sulphate and dried. Amount: 94 g.

86 g of the product are heated to 340° C. in the course of 60 minutes. 58 g are obtained (of support (6)).

Analysis: Mn: 39.5% Cr: 23.3% $Li_2O$: 0.34%

10.0 g of the support (6) are treated with 248 mg of $RuCl_3.XH_2O$ (40.4% of Ru) in 20 ml of 0.02 N HCl, and 14 ml of N NaOH, in the manner described in Example 5.

10.0 g are obtained (catalyst (6)).

EXAMPLE 7

84.6 g of $MnSO_4.H_2O$ and 63.0 g of $(NH_4)_2Cr_2O_7$ are dissolved in Z ml of water, and a mixture of Y ml of 2 N KOH and X ml of 6 N $NH_3$ is added at room temperature in the course of 10 minutes, whilst stirring. The mixture is subsequently stirred for 30 minutes and the precipitate is filtered off, washed until free from sulphate and dried. The filter cakes W are heated to 310° C. in the course of 60 minutes in each case. The supports (7a) to (7d) are obtained, and from these the catalysts (7a) to (7d) are obtained in the manner described in Example 5.

Table 3:

| | | | | |
|---|---|---|---|---|
| Z (ml of water) | 570 | 650 | 740 | 760 |
| Y (ml of 2 N KOH) | 250 | 125 | 50 | 25 |
| X (ml of 6 N $NH_3$) | 41.4 | 83.3 | 108.3 | 116.7 |
| W (g) | 98 | 108 | 115 | 97 |
| Support | (7a) | (7b) | (7c) | (7d) |
| Analysis: Mn (%) | 28.7 | 32.2 | 32.0 | 33.2 |
| Cr (%) | 25.7 | 27.0 | 28.9 | 29.7 |
| $K_2O$ (%) | 7.1 | 4.8 | 2.2 | 1.2 |
| Catalyst | (7a) | (7b) | (7c) | (7d) |
| Analysis: Ru (%) | 1.0 | 1.0 | 1.0 | 1.0 |

EXAMPLE 8

A mixture of 2,000 ml of 2 N potassium hydroxide solution and 500 ml of 6 N ammonia solution is allowed to run into a solution of 1,015 g of $MnSO_4.H_2O$ and 756 g of $(NH_4)_2Cr_2O_7$ in 6,840 ml of water at room temperature in the course of 40 minutes, whilst stirring. The mixture is subsequently stirred for 2 hours, the precipitate is filtered off and the filter cake is washed until free from sulphate and dried at 120° C.

994 g of a brown-black powder are obtained, which is heated to 300° C. for 45 minutes in an apparatus which permits slow stirring of the powder.

830 g of support (8) are obtained.

Analysis: Mn: 31.5% Cr: 23.4% K₂O: 4.7%.

800 g of the support (8) are mixed with 24 g of graphite and the mixture is shaped into 3 mm tablets. 750 g of the tablets thus obtained are because sprayed successively with a solution of 9.9 g of RuCl₃.XH₂O (38.0% of Ru) in 300 ml of 0.1 N HCl and with 300 ml of 4 N potassium hydroxide solution in a coating drum, heated to 120° C., in the course of about 60 minutes, at the rate at which the solvent evaporates.

After cooling, the catalyst is then washed with N potassium hydroxide solution until free from chloride and dried. Catalyst (8). Alkali metal content of the catalyst: 5.7% of K₂O.

EXAMPLE 9 (USE)

In each case 100 g of 4,4'-diamino-diphenylmethane are hydrogenated in an autoclave in the pressure range from 200 to 280 bars at temperatures between 250° and 280° C. using the pulverulent catalysts listed in the table below, until the absorption of hydrogen has ended. The results listed in the table are thereby obtained.

Table 4

| Catalyst No. | Composition | Amount (g) | Hydrogenation temperature (°C.) | Hydrogenation time Minutes | By-products | Yield (%) CH₂(C₆H₁₀NH₂)₂ | Distillation residue |
|---|---|---|---|---|---|---|---|
| 1a | Ru(1%)—Cr—Mn—Na | 0.5 | 250 | 63 | 0.9 | 98.4 | 0.7 |
| 1b | Ru(1%)—Cr—Mn—Na | 0.5 | 250 | 68 | 0.8 | 98.6 | 0.6 |
| 1c | Ru(1%)—cr—mn—na | 0.5 | 250 | 72 | 0.7 | 98.3 | 1.0 |
| 1d | Ru(1%)—Cr—Mn—Na | 0.5 | 250 | 82 | 1.0 | 98.0 | 1.0 |
| 1b | Ru(1%)—Cr—Mn—Na | 0.2 | 250 | 185 | 0.7 | 98.3 | 1.0 |
| 1a | Ru(1%)—Cr—Mn—Na | 0.1 | 280 | 540 | 1.2 | 96.8 | 2.0 |
| 3 | Ru(0.95%)—Cr—Mn—K | 0.5 | 250 | 75 | 0.6 | 1.1 | 1.1 |
| 4 | Ru(1%)—Cr—Mn—K | 0.5 | 250 | 130 | 0.8 | 97.7 | 1.5 |
| 5 | Ru(1%)—Cr—Mn—Na | 0.5 | 250 | 90 | 1.2 | 98.2 | 0.6 |
| 6 | Ru(1%)—Cr—Mn—Li | 0.5 | 250 | 95 | 1.3 | 96.6 | 2.1 |
| 7a | Ru(1%)—Cr—Mn—K | 0.5 | 250 | 90 | 0.6 | 98.8 | 0.6 |
| 7b | Ru(1%)—Cr—Mn—K | 0.5 | 250 | 85 | 0.8 | 98.2 | 1.0 |
| 7c | Ru(1%)—Cr—Mn—K | 0.5 | 250 | 105 | 0.9 | 98.3 | 0.8 |
| 7b | Ru(1%)—Cr—Mn—K | 0.1 | 280 | 690 | 1.1 | 97.1 | 1.8 |
| Comparison experiment: Catalyst (1b) of German Offenlegungsschrift 2,502,894 corresponds with catalyst (2) of U.S. Pat. No. 4,049,584 | | 0.1 | 280 | 1,920 | 2.0 | 94.2 | 3.8 |

EXAMPLE 10 (USE)

The arrangement which follows was chosen for rapid testing of the suitability of catalysts in the form of lumps for the trickle process.

A number of hydrogenations are carried out successively, with 90 g of diaminodiphenylmethane in each case, under standard conditions (250° C., 200–280 bars) in a 250 ml shaken autoclave, the inside of which is provided with a centrally positioned perforated basket, fixedly connected to the autoclave, in which in each case 9.0 g of the sample of catalyst, in the form of lumps, to be tested are filled in a manner such that the particles of catalyst cannot move against one another, the catalyst remaining under a high pressure of H₂ and at a high temperature during replacement of each hydrogenation product by the starting material, so that a rapid sequence of hydrogenations is possible.

The results of this catalyst test are summarised in Table 5. As can be seen from these results, the hydrogenations using catalysts 2a to 2f and 8, containing alkali metal compounds, give significantly better yields, compared with catalyst 2g (not according to the invention), associated with a low formation of by-products.

Table 5

| Catalyst No. | Composition | Hydrogenation number | Hydrogenation time (minutes) | By-products | Yield (%) CH₂(C₆H₁₀NH₂)₂ | Distillation residue |
|---|---|---|---|---|---|---|
| 2a | Ru(0.5)—Cr—Mn—Na | 2 | 90 | 3.1 | 92.4 | 4.5 |
| | | 4 | 80 | 3.2 | 92.0 | 4.7 |
| | | 6 | 90 | 3.6 | 92.4 | 4.0 |
| | | φ | 88 | 3.2 | 92.5 | 4.3 |
| 2b | Ru(0.5)—Cr—Mn—Na | 2 | 100 | 4.1 | 92.5 | 3.4 |
| | | 4 | 85 | 3.7 | 92.3 | 3.8 |
| | | 6 | 85 | 3.4 | 93.1 | 3.4 |
| | | φ | 90 | 3.7 | 93.0 | 3.3 |
| 2c | Ru(0.5)—Cr—Mn—Na | 2 | 100 | 4.4 | 94.1 | 1.3 |

Table 5-continued

| Catalyst No. | Composition | Hydrogenation number | Hydrogenation time (minutes) | By-products | Yield (%) 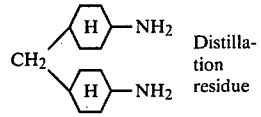 | Distillation residue |
|---|---|---|---|---|---|---|
| | | 4 | 125 | 3.7 | 94.0 | 2.1 |
| | | 6 | 120 | 3.6 | 93.4 | 2.9 |
| | | φ | 111 | 4.2 | 93.6 | 2.2 |
| 2d | Ru(0.5)—Cr—Mn—K | 2 | 110 | 2.9 | 95.0 | 2.1 |
| | | 6 | 110 | 3.8 | 94.2 | 2.0 |
| | | 17 | 120 | 3.7 | 95.0 | 1.3 |
| | | φ | 113 | 3.5 | 94.6 | 1.9 |
| 2e | Ru(0.5)—Cr—Mn—K | 2 | 85 | 4.2 | 92.4 | 3.4 |
| | | 4 | 85 | 3.6 | 94.0 | 2.4 |
| | | 6 | 95 | 3.7 | 91.7 | 5.1 |
| | | φ | 90 | 3.8 | 92.8 | 3.4 |
| 2f | Ru(0.5)—Cr—Mn—Li | 2 | 70 | 4.2 | 91.3 | 4.5 |
| | | 4 | 80 | 3.7 | 91.3 | 4.8 |
| | | 6 | 75 | 3.9 | 90.0 | 6.1 |
| | | φ | 77 | 4.1 | 91.2 | 4.7 |
| 2g | Ru(0.5)—Cr—Mn (not according to the invention) | 2 | 80 | 3.1 | 88.6 | 8.3 |
| | | 6 | 90 | 3.4 | 88.2 | 8.4 |
| | | 17 | 94 | 3.7 | 88.3 | 8.0 |
| | | φ | 97 | 3.0 | 89.5 | 7.5 |
| 8 | Ru(0.5)—Cr—Mn—K | 4 | 145 | 2.5 | 95.6 | 1.9 |
| | | 10 | 180 | 2.3 | 95.8 | 1.9 |
| | | 24 | 205 | 1.9 | 95.7 | 2.4 |
| | | φ | 179 | 2.4 | 95.4 | 2.2 |

If the experiment with catalyst (2d) is continued with 2,4-diaminotoluene, the following results are obtained:

| Catalyst No. | Notes | Hydrogenation number | Hydrogenation time (minutes) | By-products | Yield (%) 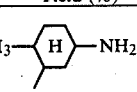 | Distillation residue |
|---|---|---|---|---|---|---|
| 2d | Used for 27 batches with diaminodiphenylmethane | 18–26 | 322 | 1.4 | 97.5 | 1.1 |

EXAMPLE 11 (COMPARISON EXAMPLE)

A commercially available Ru(0.5)—Al$_2$O$_3$ catalyst, in the form of 3 mm pellets, is employed in the same manner as described in Example 10 (11a). In a further experiment, the catalyst is employed after treatment with normal sodium hydroxide solution and drying (11b).

The results summarised in Table 6 are thereby obtained:

Table 6

| Catalyst No. | Composition | Hydrogenation number | Hydrogenation time (minutes) | By-products | Yield % 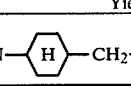 | Residue |
|---|---|---|---|---|---|---|
| 11a | Ru(0.5)—Al$_2$O$_3$ | 2 | 230 | 1.8 | 79.5 | 18.7 |
| | | 4 | 260 | 2.1 | 72.5 | 25.4 |
| | | 6 | 340 | 2.9 | 53.6 | 43.4 |
| | | φ | 273 | 2.7 | 67.8 | 29.5 |
| 11b | Ru(0.5)—Al$_2$O$_3$—Na$_2$O(0.2%) | 2 | 130 | 1.3 | 88.7 | 10.0 |
| | | 4 | 250 | 1.5 | 88.8 | 9.7 |
| | | 6 | 320 | 1.7 | 87.5 | 10.8 |
| | | φ | 235 | 1.6 | 88.5 | 9.9 |

Compared with the catalysts according to the invention, the commercially available catalysts give considerably poorer yields.

Furthermore, in the case of the last catalysts, the catalysts rapidly decrease, as can be seen from the rapid increase in the hydrogenation time of successive batches.

EXAMPLE 12

A vertical high-pressure tube of 70 cm length and 45 mm φ which is filled with 500 ml of the Ru(0.5)—Cr—Mn—K$_2$O(2,6) catalyst (2d), is heated to 160° C. under a pressure of 150 bars and under a stream of nitrogen of 600 Nl/hour. The pressure is then increased to 300 bars whilst 200 g of 4,4-diaminodiphenylmethane and 600 l of hydrogen per hour are metered in co-current over the catalyst. The reactor temperature is first increased to 170° C. and then increased to 180°–190° C. in the course of the next 45 days.

Initial temperatures of 190°–260° C. are thereby established in the loose material in the reactor, which increase up to 290°–300° C. in the course of 45 days. A colourless reaction product which solidifies at about 40°–43° C. is obtained. The composition of the reaction product remains essentially constant during the operating time mentioned. At the start it consists of 0.7% of aminodicyclohexylmethane, 98.8 of diaminodicyclohexylmethane and 0.5% of distillation residue, and after 45 days it consists of 0.9% of aminodicyclohexylmethane, 97.0% of diaminodicyclohexylmethane and 2.1% of distillation residue.

EXAMPLE 13 (COMPARISON EXPERIMENT)

500 ml of the Ru(0.5)—Al$_2$O$_3$—Na$_2$O(2.0) catalyst (11b) described in Example 11 are incorporated into the high-pressure tube described in Example 12 and the procedure described in Example 12 is then followed. At a reactor temperature of 175° C. and a throughput over the catalyst of 0.2 kg of diaminodiphenylmethane per liter of catalyst and per hour, a reaction product is obtained which consists of 0.9% of aminodicyclohexylmethane, 85.5% of diaminodicyclohexylmethane, 2.5% of aminocyclohexyl-aminophenylmethane, 0.9% of diaminodiphenylmethane and 10.2% of distillation residue. If the throughput over the catalyst is increased to 0.4 kg of diaminodiphenylmethane per liter of catalyst and per hour, the reaction product consists of 1.0% of aminodicyclohexylmethane, 83.0% of dicyclohexylmethane, 5.4% of aminocyclohexylaminophenylmethane, 3.4% of diaminodiphenylmethane and 7% of distillation residue.

EXAMPLE 14

4,970 g of a condensation product of aniline and formaldehyde, consisting of the extent of 92.9% by weight of dinuclear compounds (p=0), to the extent of 5.2% by weight of trinuclear compounds (p=1) and to the extent of 1.9% by weight of compounds which are tetranuclear and more than tetranuclear, of the formula

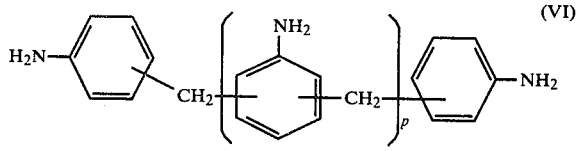

are stirred in a 10 l autoclave in the presence of 24.8 g of the Ru(1.0%)—Mn—Cr—Na catalyst (1c) prepared according to Example 1, at 250° C. under a hydrogen pressure of 200 to 280 bars, the hydrogen consumed being replaced, until the absorption of hydrogen has ended. Duration: 265 minutes.

After cooling to 100° C., the reaction product is separated off from the catalyst by filtration under pressure, and, after washing with 0.3 normal sodium hydroxide solution, the catalyst is again treated with hydrogen together with 4,140 g of the starting product, described above, at 250° C. in the pressure range from 200 to 280 bars until no further decrease in pressure occurs. Duration: 280 minutes.

After cooling to 100° C., the reaction product is separated off from the catalyst as described above and purified together with the first hydrogenation product.

9,660 g of a hydrogenation product are obtained, most of which can be distilled at 110° to 220° C. under a pressure of 0.3 mm Hg which, according to analysis by distillation and analysis by gas chromatography, has the following composition: 1.2% by weight of aminodicyclohexylmethane and unknown components, 92.8% by weight of diaminodicyclohexylmethane, 4.1% by weight of triaminotricyclohexyldimethane and 1.9% by weight of distillation residue.

EXAMPLE 15

5 hydrogenations are carried out successively in a 10 liter stirred autoclave. The amounts listed in Table 7 below of a condensation product of aniline and formaldehyde which consists to the extent of 72% by weight of dinuclear compounds (p=0), to the extent of 17% by weight of trinuclear compounds (p=1) and to the extent of 11% by weight of compounds which are tetranuclear or more than tetranuclear, of the formula VI (according to Example 14) and also contains small amounts of aniline, water and sodium chloride, are thereby employed.

The hydrogenations are carried out at 250° C. under a hydrogen pressure of 200 to 280 bars, with the addition of the amounts given in Table 7 of the Ru(1.0%)—Mn—Cr—Na catalyst (1b) prepared according to Example 1, the catalyst used in each case for the preceding batch being re-used, after separating off the hydrogenation product.

Table 7

| Hydrogenation | Starting product (g) | Amount of catalyst (g) | Hydrogenation time (minutes) |
|---|---|---|---|
| 1 | 4,030 | 20 | 570 |
| 2 | 4,635 | 13 | 520 |
| 3 | 4,050 | 12 | 525 |
| 4 | 4,210 | 10 | 450 |
| 5 | 4,000 | 8 | 468 |

A total of 21,982 g of hydrogenation product are obtained as an almost colourless, somewhat viscous liquid.

On distillation of the hydrogenation product, 19,420 g of a distillate are obtained which boils at 100 to 220° C. under a pressure of 3 mm Hg and, according to analysis by gas chromatography, has the following composition: 1.3% by weight of cyclohexylamine and aminodicyclohexylmethane, 80.3% by weight of diaminodicyclohexylmethane and 18.4% by weight of bis-(aminocyclohexylmethane)-cyclohexylamine, as well as 2,562 g of a distillation residue consisting of cycloaliphatic polyamines which are tetranuclear and more than tetranuclear.

EXAMPLE 16

If the procedure followed is as described in Example 15, but instead of this, the amount given in Table 8 of a condensation product of aniline and formaldehyde which consists to the extent of 62% by weight of dinuclear compounds (p=0), to the extent of 18% by weight of trinuclear compounds (p=1) and the to the extent of 20% by weight of compounds which are tetranuclear and more than tetranuclear, of the formula VI (according to Example 14), are employed as the starting product, after 5 hydrogenation batches, a total of 20,480 g of hydrogenation product are obtained in the form of an almost colourless, somewhat viscous liquid.

Table 8

| Hydrogenation batch | Starting product (g) | Amount of catalyst (g) | Hydrogenation time (minutes) |
|---|---|---|---|
| 1 | 4,110 | 20 | 570 |
| 2 | 4,440 | 13 | 465 |
| 3 | 4,190 | 12 | 385 |
| 4 | 4,030 | 12 | 330 |
| 5 | 3,840 | 8 | 385 |

According to analysis by distillation and analysis by gas chromatography of the portion which can be distilled, the hydrogenation product has the following composition: 1.0% by weight of aminodicyclohexylmethane and traces of other compounds, 61.0% by weight of diaminodicyclohexylmethane, 17.8% by weight of bis-(aminocyclohexylmethyl)-cyclohexylamine and 20.3% by weight of cycloaliphatic polyamines which are tetranuclear and more than tetranuclear.

EXAMPLE 17

After the operating time of 45 days described in Example 12, instead of 4,4'-diaminodiphenylmethane, 200 g of a condensation product of aniline and formaldehyde consisting to the extent of 89% by weight of dinuclear compounds (p=0), to the extent of 8.2% by weight of trinuclear compounds (p=1) and to the extent of 2.8% by weight of compounds which are tetranuclear and more than tetranuclear, of the formula VI (according to Example 14), are metered in per hour into a vertical high-pressure tube of 70 cm length and 45 mm diameter, which is filled with 500 ml of the Ru(0.5-%)—Mn—Cr—$K_2O$(2.6%) catalyst (2d) prepared according to Example 2.

At the same time, 600 N l of hydrogen per hour are passed over the catalyst under a pressure of 300 bars. The reactor temperature is kept at 200° C. Temperatures of about 240° to 300° C. are thereby established in the loose catalyst. 212 g per hour of a colourless hydrogenation product are obtained, which has the following average composition: 1.3% by weight of aminodicyclohexylmethane and traces of unknown compounds, 87.1% by weight of diaminodicyclohexylmethane, 7.5% by weight of bis-(aminocyclohexylmethyl)-cyclohexylamine and 4.1% by weight of distillation residue, consisting of polyamines which are tetranuclear and more than tetranuclear.

After an operating time of 30 days, during which the temperature in the loose catalyst has been raised by about 10° C., a reaction product is obtained which has the following average composition: 2.6% by weight of aminodicyclohexylmethane and traces of unknown compounds, 85.4% by weight of diaminodicyclohexylmethane, 7.6% by weight of bis-(aminocyclohexylmethyl)-cyclohexylamine and 4.4% by weight of distillation residue.

What is claimed is:

1. A supported ruthenium catalyst comprising ruthenium disposed on a catalyst support comprising a hydroxide, hydrated oxide or oxide of chromium and manganese, said catalyst additionally containing an inorganic and/or organic alkali metal compound.

2. A catalyst according to claim 1 wherein said inorganic and/or organic alkali metal compound is an oxide, hydroxide, alcoholate, carbonate, bicarbonate or carboxylic acid salt with up to 7 carbon atoms of an alkali metal and/or the reaction product thereof with a chromium and/or manganese compound contained in the catalyst.

3. A catalyst according to claim 1 wherein the inorganic and/or organic alkali metal compound is lithium hydroxide, sodium oxide, sodium hydroxide, sodium carbonate, sodium bicarbonate, sodium methylate, sodium ethylate, sodium acetate, potassium oxide, potassium hydroxide, potassium carbonate, potassium methylate, rubidium hydroxide and/or a reaction product thereof with a chromium compound or manganese compound contained in the catalyst.

4. A catalyst according to claim 1 wherein the alkali metal compound is present in an amount, calculated as the oxide, of from 0.05 to 15 percent by weight.

5. A catalyst according to claim 1 wherein the content of alkali metal compound, calculated as the oxide, is 0.1 to 10 percent by weight.

6. A process for the preparation of a supported ruthenium catalyst comprising ruthenium disposed on a support of a hydroxide, hydrated oxide or oxide of chromium and manganese, said catalyst containing an organic and/or inorganic alkli metal compound which comprises contacting a catalyst comprising ruthenium disposed on a support of an oxide, hydroxide or hydrated oxide of chromium and manganese with a solution of an organic and/or inorganic alkali metal compound and thereafter drying the so-treated support.

7. A process according to claim 6 wherein the organic and/or inorganic alkali metal compound is an oxide, hydroxide, alcoholate, carbonate, bicarbonate of an alkali metal or an alkali metal salt of a lower carboxylic acid having up to 7 carbon atoms.

8. A process according to claim 6 wherein the alkali metal compound is lithium hydroxide, sodium oxide, sodium hydroxide, sodium carbonate, sodium bicarbonate, sodium methylate, sodium ethylate, sodium acetate, potassium oxide, potassium hydroxide, potassium carbonate, potassium methylate or rubidium hydroxide.

9. A process according to claim 6 wherein the concentration of alkali metal compound in the solution is 0.02 to 5 normal.

10. A process according to claim 6 wherein the catalyst support is one obtained by heating an ammonium manganese chromate at a temperature in the range of 200 to 450° C.

11. A process for the preparation of a supported ruthenium catalyst comprising ruthenium supported on a hydroxide, hydrated oxide or oxide of chromium and manganese, said catalyst also containing an alkali metal compound which comprises disposing ruthenium on a catalyst support which has been obtained by heating a mixed alkali metal manganese chromate to a temperature of 200° to 450° C.

12. A process for the preparation of a supported ruthenium catalyst comprising ruthenium supported on a support of a hydroxide, hydrated oxide or oxide of chromium and manganese which comprises heating a mixed alkali metal ammonium manganese chromate to a temperature of 200° to 450° C. and disposing ruthenium thereon.

13. A process according to claim 11 wherein the catalyst is thereafter treated with a solution of organic and/or inorganic alkali metal compound and the so-treated support is thereafter dried.

14. A process according to claim 12 wherein the catalyst is thereafter treated with a solution of an organic or inorganic alkali metal compound and the so-treated support is thereafter dried.

15. A process for the catalytic hydrogenation of an aromatic amine which comprises contacting an aromatic amine with a source of hydrogen in the presence of the catalyst of claim 1.

16. A process according to claim 15 wherein the aromatic amine is one of the formula

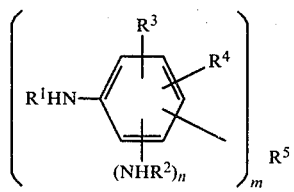

wherein
$R^1$, $R^2$, $R^3$ and $R^4$ are identical or different and represent hydrogen or an alkyl radical,
n represents the numbers 0 or 1.
m represents the numbers 1, 2 or 3, and
$R^5$ represents hydrogen or an optionally substituted monovalent, divalent or trivalent aliphatic, cycloaliphatic, araliphatic or aromatic radical.

17. A process according to claim 15 wherein the aromatic compound undergoing hydrogenation is a mixture of condensation products of aniline and formaldehyde of the general formula

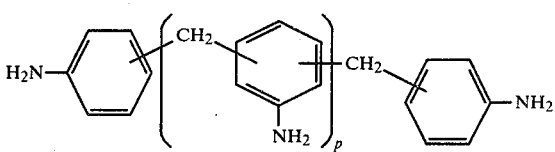

wherein P represents the numbers 0 and 1 to 5 and the hydrogenation is performed without prior separation of the components of the mixture into the individual constituents.

18. A process according to claim 17 wherein the reactant has a dinuclear component where p=0 of more than 50 percent by weight and a content of compounds which are tetranuclear and greater than tetranuclear (p=2 to 5) of less than 30 percent by weight.

19. A process according to claim 17 wherein the starting product has a dinuclear content where p=0 of more than 60 percent by weight and a content of compounds which are tetranuclear and more than tetranuclear where p=2 to 5 of less than 15 percent by weight.

* * * * *